United States Patent
Ye

(10) Patent No.: US 6,878,047 B1
(45) Date of Patent: Apr. 12, 2005

(54) APPARATUS FOR REPAIRING COMPACT DISKS

(76) Inventor: Guangda Ye, No. 5 Tianwan Road, Tianliaocun, Gongming Town, Baoan Distric, Shenzhen (CN), 518132

( * ) Notice: Subject to any disclaimer, the term of this patent is extended or adjusted under 35 U.S.C. 154(b) by 70 days.

(21) Appl. No.: 10/704,445

(22) Filed: Nov. 7, 2003

(51) Int. Cl.[7] .................................................. B24B 5/00
(52) U.S. Cl. ........................ 451/290; 451/287; 451/285
(58) Field of Search .............................. 457/7, 9, 287, 457/290, 259, 288, 269, 283; 15/77, 88.2, 102, 92.1

(56) References Cited

U.S. PATENT DOCUMENTS

| | | | | |
|---|---|---|---|---|
| 4,179,852 A | * | 12/1979 | Barnett | 451/63 |
| 4,561,142 A | * | 12/1985 | Mischenko et al. | 15/97.1 |
| 4,713,856 A | * | 12/1987 | Clausen | 15/97.1 |
| 5,102,099 A | * | 4/1992 | Brown et al. | 451/283 |
| 5,938,510 A | * | 8/1999 | Takahashi et al. | 451/290 |
| 6,322,430 B1 | * | 11/2001 | Kennedy et al. | 451/287 |
| 6,386,946 B1 | * | 5/2002 | Lin et al. | 451/7 |
| 6,685,546 B1 | * | 2/2004 | Del Raso | 451/356 |

* cited by examiner

Primary Examiner—George Nguyen
(74) Attorney, Agent, or Firm—Procopio Cory Hargreaves & Savitch LLP

(57) ABSTRACT

The present invention discloses a repair apparatus for compact disks comprising a casing unit having a top housing and a bottom housing openably fastened to the top housing; a transmission module disposed within the bottom housing, including a motor, a disk supporting pedestal for supporting the compact disk and being connected with the motor, and a repair base adjacent the disk supporting pedestal; a repair member disposed within the repair base, including a grinding element or a cleaning element at the upper surface thereof for operable rotational contact with the repair area; and a disk-depressing mechanism including an upper cover connected to the top housing, a disk-depressing member operably contacted with the compact disk, and a plurality of spherical bodies rotatably and movably disposed between the upper cover and the disk-depressing member. While the motor drives the disk supporting pedestal to rotate, the repair member is driven to rotate so that the grinding element or the cleaning element can perform a grinding operation or a cleaning operation to the repair area of the compact disk.

19 Claims, 5 Drawing Sheets

APPARATUS FOR REPAIRING COMPACT DISKS

BACKGROUND OF THE INVENTION

1. Field of the Invention

The present invention generally relates to an apparatus for maintaining compact disks (CD), and more particularly to an apparatus for repairing or/and cleaning compact disks.

2. Description of the Related Art

Developments in data storage technology have resulted in extensive use of compact disks. As a result, the increasing need of repairing compact disks rises accordingly because compact disks are prone to be scratched. This requires repair machines for compact disks.

Many repair machines have been disclosed in the art. U.S. Pat. No. 5,102,099 granted to Brown et al discloses a disk polisher apparatus, which includes one or more rotational disk polisher means. U.S. Pat. No. 6,386,946 also discloses a repair machine for compact disks which comprises a cooling unit. Repair machines for compact disks disclosed in the prior art have a complicated structure and the following disadvantages. Firstly, many of them are only suitable for repairing very tiny scratches or have only cleaning function. Secondly, most of them fix a compact disk by means of fixing the central non-data area or the periphery of the compact disk. As a result, the compact disk has an unstable rotation or the machine is only suitable for the compact disk with a diameter of 120 mm. This leads to a lower repair efficacy. Thirdly, the force pressing the compact disk should be kept smaller to achieve a better repair effect. Fourthly, most of them make use of twisty spring to control the upper cover of the machine, and a larger force is needed to be used for opening or closing the upper cover.

Hence, an apparatus for repairing compact disks that overcomes the above-mentioned problems in the art is desired.

SUMMARY OF THE INVENTION

Accordingly, an object of the present invention is to provide an apparatus for repairing compact disks which overcomes the shortcomings in the prior art.

In order to achieve the above-mentioned object, the apparatus for repairing compact disks of the present invention comprises a casing unit having a top housing and a bottom housing openably fastened to the top housing; a transmission module disposed within the bottom housing, including a motor, a disk supporting pedestal for supporting the compact disk and being connected with the motor, and a repair base adjacent the disk supporting pedestal; a repair member disposed within the repair base, including a grinding element or a cleaning element at the upper surface thereof for operable rotational contact with the repair area; and a disk-depressing mechanism including an upper cover connected to the top housing, a disk-depressing member operably contacted with the compact disk, and a plurality of spherical members rotatably and movably disposed between the upper cover and the disk-depressing member. While the motor drives the disk supporting pedestal to rotate, the repair member is driven to rotate so that the grinding element or the cleaning element can perform a grinding operation or a cleaning operation to the repair area of the compact disk.

In one embodiment of the present invention, the disk-depressing member provides an annular channel to allow the movement of the spheral members therein.

In another embodiment of the present invention, the disk-depressing member comprises a disk plate rotatably connected with the upper cover, and a plurality of gaskets made of elastic materials and provided at the lower surface of the disk plate and operably contacted to the compact disk.

In a further embodiment of the present invention, the repair member includes a plug at a bottom portion thereof which is removably inserted into a socket provided by the repair base at an upper portion thereof, an annular groove at an upper portion thereof, and an elastomer made of elastic materials and removably retained within the annular groove.

In a still embodiment of the present invention, the disk supporting pedestal includes a first shaft connected with the motor through a plurality of gears engaging each other, and a spring element housing the first shaft.

The apparatus of the invention may further comprises a damping member for connecting the top housing with the bottom housing consisting of two portions, each including a damping head, a first spring disposed within the damping head, and a transmission shaft extended through a first spring and a second spring.

Preferably, the invention can also comprise a disk-detecting element located on the top housing for detecting the presence of the disk, and a repair-detecting element located within the repair base for detecting the presence of the repair member.

Comparing to the prior art, the apparatus of the present invention can apply to any sizes of compact disks and achieve the purpose of repairing compact disks.

Other objects, features and advantages of the present invention will become apparent from the following detailed description in conjunction with the accompanying drawings.

DETAILED DESCRIPTION OF PREFERRED EMBODIMENTS OF THE INVENTION

The present invention will be further described below with reference to the drawings.

Figure 1:
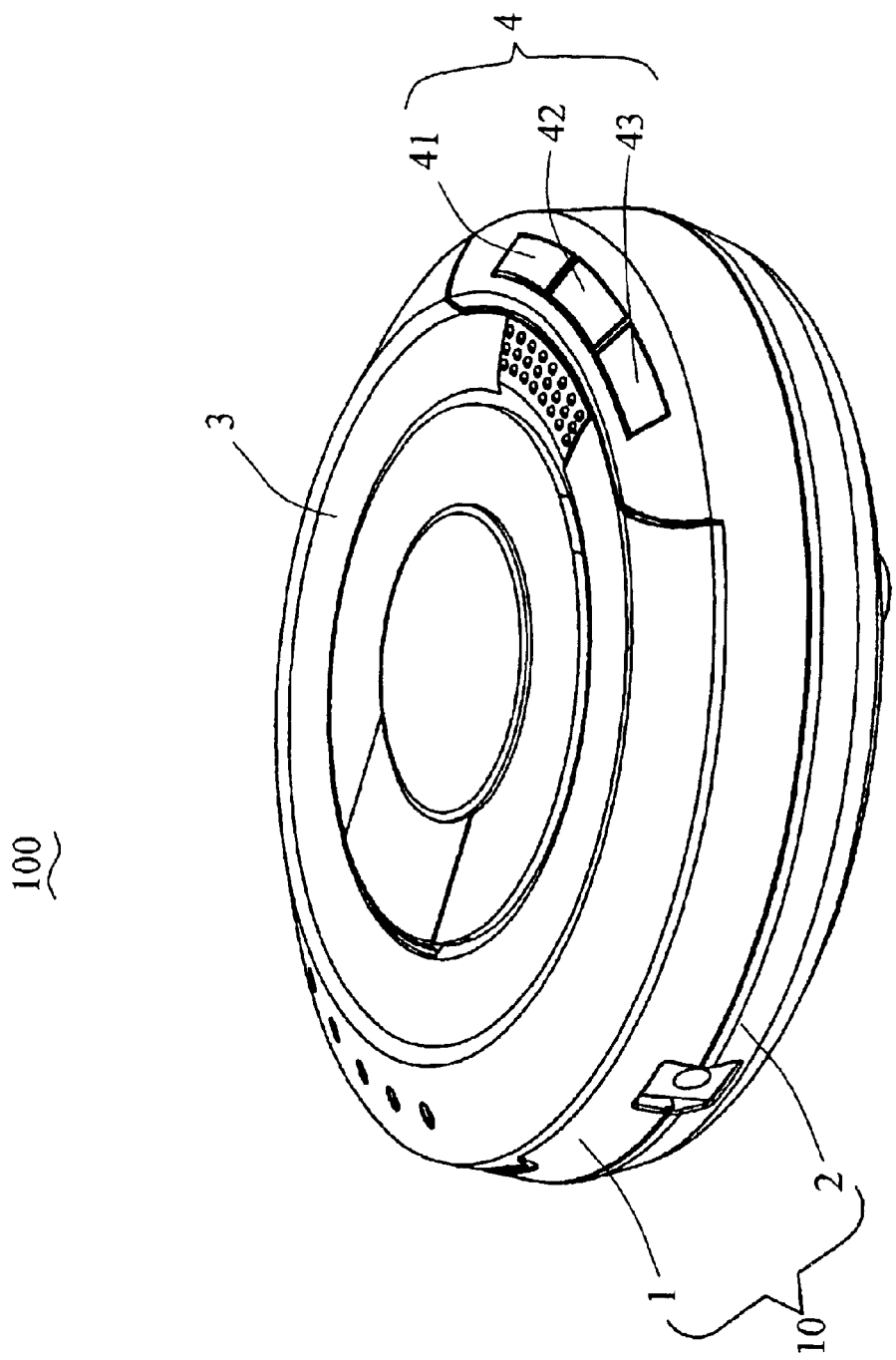
FIG. 1 is a schematically perspective view of an embodiment of the apparatus according to present invention.
Figure 2:
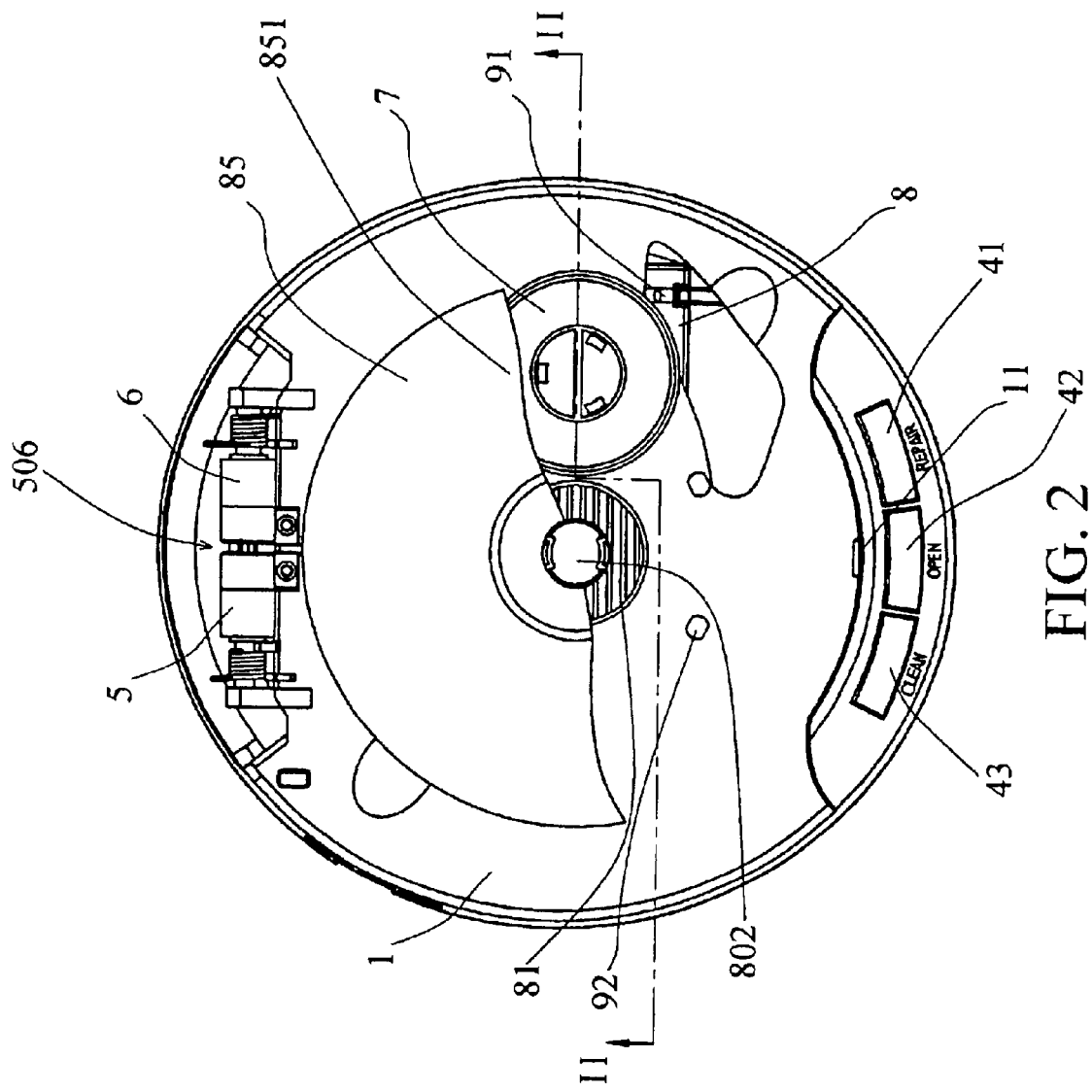
FIG. 2 is a schematic top view of the apparatus as shown in FIG. 1, in which the upper cover is removed.

Referring to FIGS. 1 and 2, an apparatus 100 in accordance with the present invention includes a casing unit 10 that consists of a top housing 1 and a bottom housing 2. The top housing 1 is connected to the bottom housing 2 with a damping member 506 consisting of two portions 5, 6. A plurality of switches 4 consisting of three switches 41, 42, 43 in this embodiment are disposed at the top housing 1. A transmission module 8 having a disk supporting pedestal 81 is mounted to the bottom housing 2. A compact disk 85 having a repair area 851 may be mounted onto a first shaft 802. A repair member 7 for repairing the disk 85 is connected with the transmission module and disposed adjacent the disk supporting pedestal 81. A disk-depressing mechanism 3 is fixed to the top housing 1.

Figure 3:
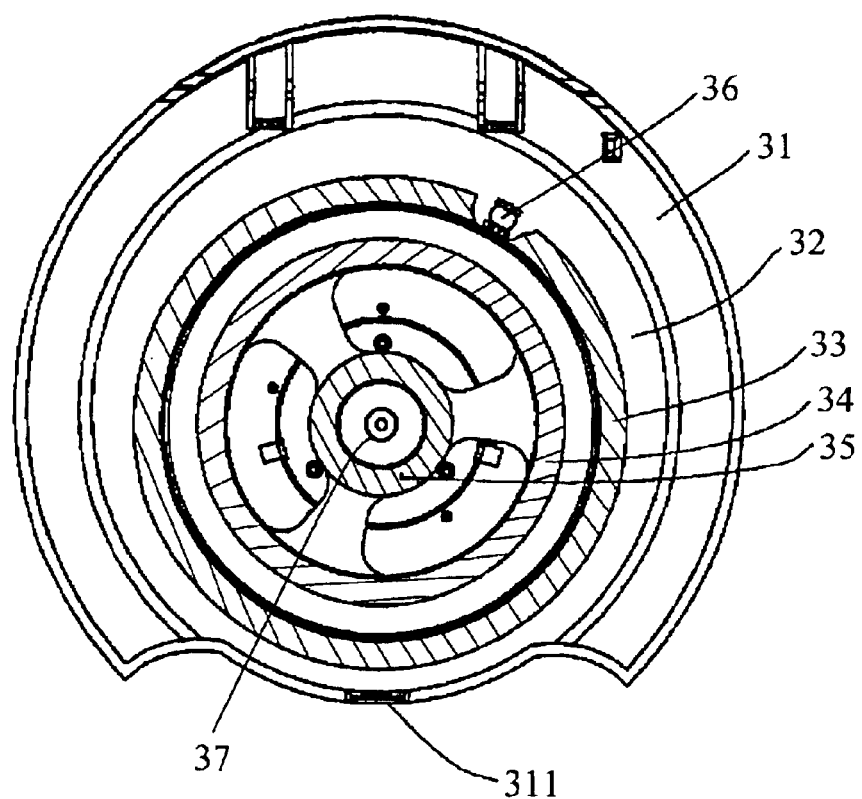
FIG. 3 and FIG. 4 are schematic views showing a disk-depressing mechanism of the invention.
Figure 4:
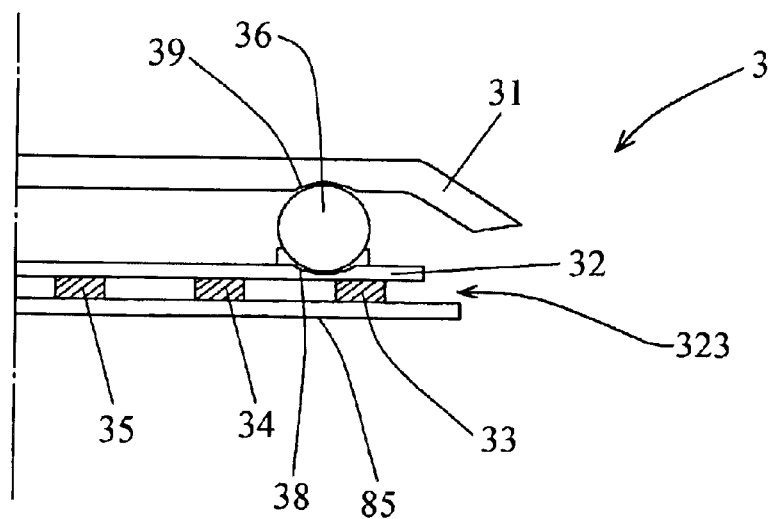

Now referring to FIGS. 3 through 4, the disk-depressing mechanism 3 is provided for depressing the compact disk 85 when the apparatus works, and includes an upper cover 31 that is fixed to the top housing 1 and a disk-depressing member 323 positioned under the upper cover 31. The disk-depressing member 323 includes a disk plate 32 pivotedly connected to a central shaft 37, and three gaskets 33, 34, 35 made of elastic materials provided at the lower surface of the disk plate 32 and operably contacted to the compact disk 85. Three spheral members 36 disposed at the same circumference with a proportional space each other (only showing one in, FIGS. 3 and 4) are provided between the disk plate 32 and the upper cover 31. A recess 39 is provided by the upper cover for receiving the spheral member 36 at the surface facing the disk plate 32, and an annular channel 38 to allow the spheral members 36 move therein is provided by the disk plate 32 at its upper surface. Of course, the channel 38 can be alternatively disposed at the surface of the upper cover 31 opposite the disk plate 32. In this case, the recess 39 is provided at the upper surface of the disk plate 32.

Three coplanar gaskets 33, 34 and 35 made of elastic materials with a higher friction are mounted on the lower surface of the disk plate 32, and they contact the disk 85 when the repair operation performs. In this embodiment, the switches 41, 42, 43 made of transparent materials are disposed at the front end of the top housing 1, and respectively represents a cleaning switch, an opening switch, and a repairing switch. A slot 11 (as shown in FIG. 2) is disposed at the front end of the top housing 1 for engaging a latching hook 311 disposed at the front end of the upper cover 31 to make the apparatus in the operation state.

Figure 5:
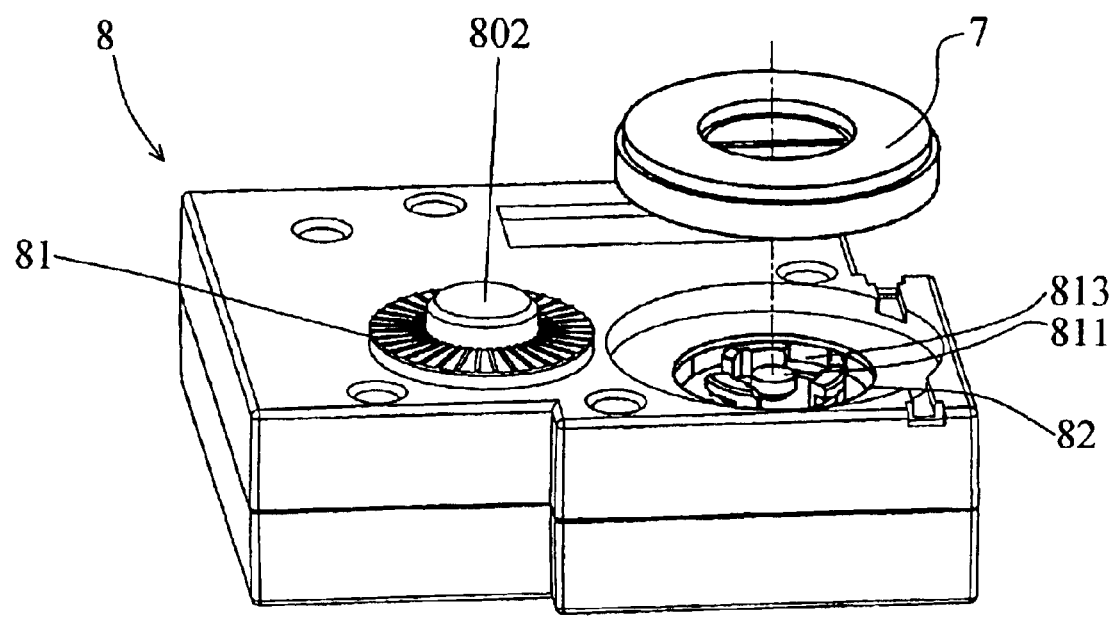
FIG. 5 is a partial exploded view of the invention, showing a transmission module and a repair mechanism.
Figure 6:
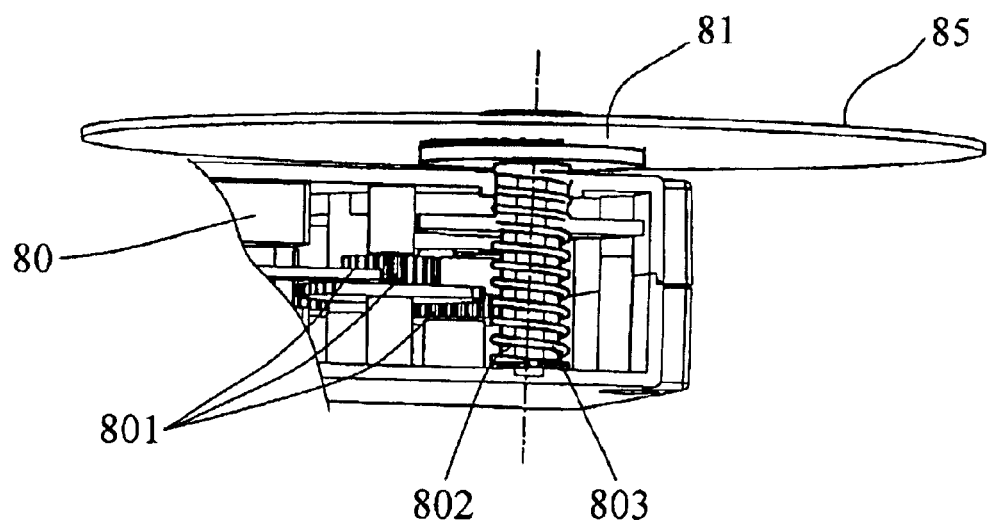
FIG. 6 and FIG. 7 are schematic cutaway views taken along line II—II of FIG. 2 showing the structure of a disk supporting pedestal and a repair mechanism.

As shown in FIGS. 5 and 6, the transmission module 8 is disposed at the center of the bottom housing 2, and includes the disk supporting pedestal 81 for supporting the compact disk, a motor 80 and a repair base 82. A spring element 803 disposed under the disk supporting pedestal 81 encompasses the first shaft 802 to keep no relative movement retained between the disk-depressing member 323 and the disk 85. The motor 80 drives the disk 85 to rotate by means of a plurality of gears 801 engaging each other. The repair base 82 has a second shaft 811 that is also driven by the motor 80, and three sockets 813 engaged to corresponding plugs 713 of the repair member 7, as shown in FIG. 7.

Figure 7:
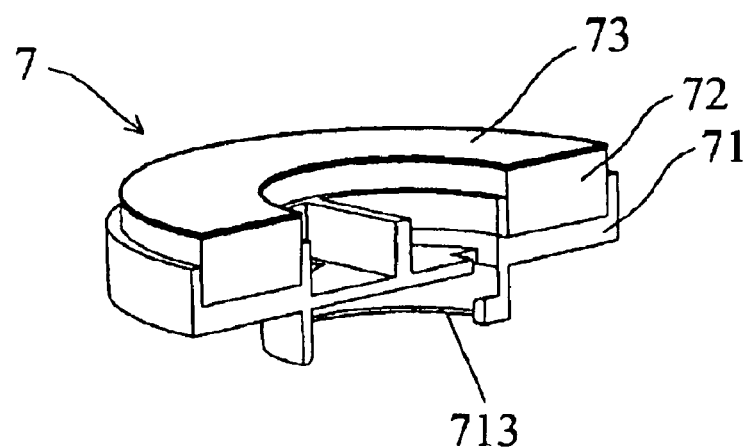

Now turning to FIG. 7, the repair member 7 includes an annular groove 71 disposed at its upper portion, and an elastomer 72 that may be made of EVA is removably retained within the annular groove 71. The elastomer is designed to have an annular acting surface that covers the whole repair area 851 of the disk 85 when the apparatus operates. An abrasive paper 73 having a rough surface is attached to the elastomer 72 with an adhesive when a grinding operation performs, and a detergent can be placed on the elastomer 72 directly. Alternatively, different elastomers 72 can be prepared for the grinding operation and the cleaning operation, respectively.

As described above, the three plugs 713 disposed at the bottom portion of the member 7 are removably inserted into the three sockets 813 so that the motor 80 can drive the member 7 to rotate around the second shaft 811.

Figure 8:
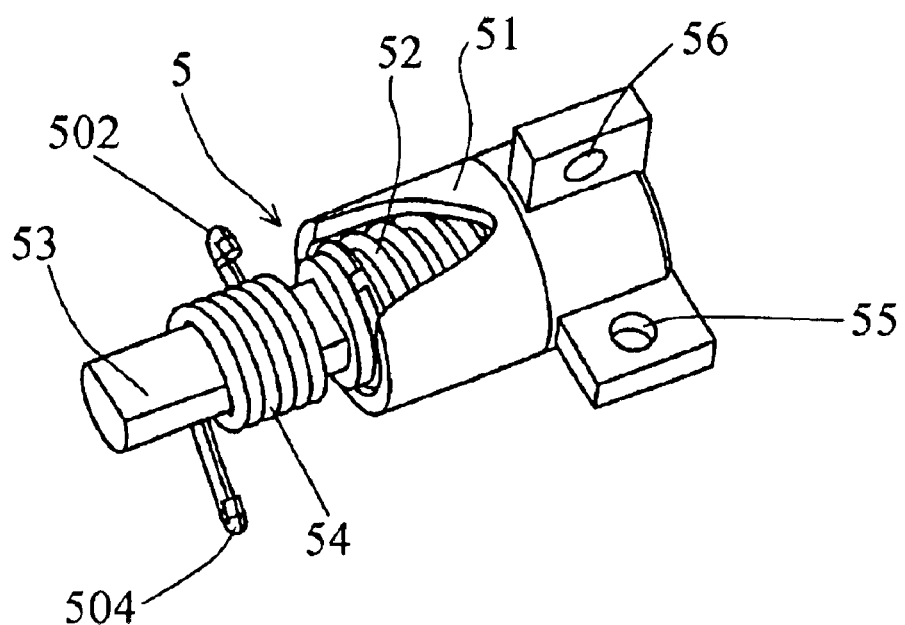
FIG. 8 is a perspective view of a portion of a damping member according to the present invention.

As shown in FIG. 8, the portion 5 of the damping member 506 is symmetrical with the portion 6 thereof. The portion 5 includes a damping head 51, a first spring 52 disposed in the head 51, a second spring 54, and a transmission shaft 53. The transmission shaft 53 extends through the first spring 52 and the second spring 54. The portion 5 is fixed to the bottom housing 2 through screw holes 55 and 56. The second spring 54 provides a first end 502 for sustaining the top housing 1, and a second end 504 connected to the bottom housing 2. With such a structure, the top housing 1 is always kept opening relative to the bottom housing 2 with a twisting force provided by the damping member 506.

Alternatively, as shown in FIG. 2, the apparatus 100 can further comprise a disk-detecting element 92 located on the top housing 1 for detecting the presence of the disk 85 by means of photoelectric detection means (not shown), and a repair-detecting element 91 located within the repair base 8 for detecting the presence of the repair member 7 by means of photoelectric detection means (not shown).

The operation of the apparatus 100 of the present invention is now described as follows. When a scratched disk is to be repaired, the opening switch 42 is pressed to open the upper cover 31. The repair member 7 is mounted onto the repair base 82, and the disk 85 is then mounted onto the disk supporting pedestal 81. After the upper cover 31 is closed, the repairing switch 43 is triggered to perform grinding operation. In the presence of detecting elements, the disk-detecting element 92 of the apparatus can automatically detect the disk and trigger the grinding operation by the repair-detecting element 91. After the grinding operation is completed, open the upper cover 31 and take off the disk form the disk-supporting pedestal 81. If necessary, the elastomer 72 for the grinding is replaced with another one for cleaning the disk. In this case, a proper detergent is coated on the elastomer 72, and the disk is re-mounted onto the disk supporting pedestal 81. The cleaning switch 43 then is initiated to perform the cleaning operation. The repairing time and cleaning time can be controlled by a program control IC, which is obvious for one skilled in the art.

It is understood that the particular structures embodying the present invention shown and described above are only used for illustrating the present invention, and are not intended to limit the invention. Any modifications or variations to the present invention without departing from the spirit of the invention shall be fallen into the scope of the invention defined by the appended claims.

What is claimed is:

1. An apparatus for repairing a compact disk having a repair area comprising a casing unit having a top housing and a bottom housing openably fastened to the top housing;

a transmission module disposed within the bottom housing, including a motor, a disk supporting pedestal for supporting the compact disk and being connected with the motor, and a repair base adjacent the disk supporting pedestal;

a repair member disposed within the repair base, including a grinding, element or a cleaning element at the upper surface thereof for operable rotational contact with the repair area; and a disk-depressing mechanism including an upper cover connected to the top housing, a disk-depressing member operably contacted with the compact disk, and a plurality of spheral members rotatably and movably disposed between the upper cover and said disk-depressing member, wherein while the motor drives the disk supporting pedestal to rotate, the repair member is driven to rotate so that the grinding element or cleaning element can perform a grinding operation or a cleaning operation to the repair area of the compact disk.

2. The apparatus of claim 1, wherein the disk-depressing member provides an annular channel in which the spheral members can move.

3. The apparatus of claim 1, wherein the disk-depressing member comprises, a disk plate rotatably connected with the upper cover, and a plurality of gaskets made of elastic materials and provided at the lower surface of the disk plate and operably contacted to the compact disk.

4. The apparatus of claim 2, wherein the disk-depressing member comprises a disk plate which provides the annular channel at the upper surface thereof, and a plurality of gaskets made of elastic materials and provided at the lower surface of the disk plate and operably contacted to the compact disk.

5. The apparatus of claim 2, wherein the repair member includes a plug at a bottom portion thereof which is removably inserted into a socket provided by the repair base at an upper portion thereof, an annular groove at an upper portion thereof, and an elastomer made of elastic materials and removably retained within the annular groove.

6. The apparatus of claim 3, wherein the repair member includes a plug at a bottom portion thereof which is removably inserted into a socket provided by the repair base at an upper portion thereof, an annular groove at an upper portion thereof, and an elastomer made of elastic materials and removably retained within the annular groove.

7. The apparatus of claim 4, wherein the repair member includes a plug at a bottom portion thereof which is removably inserted into a socket provided by the repair base at an upper portion thereof, an annular groove at an upper portion thereof, and an elastomer made of elastic materials and removably retained within the annular groove.

8. The apparatus of claim 2, wherein the disk supporting pedestal includes a first shaft connected with the motor through a plurality of gears engaging each other, and a spring element housing the first shaft.

9. The apparatus of claim 3, wherein the disk supporting pedestal includes a first shaft connected with the motor through a plurality of gears engaging each other, and a spring element housing the first shaft.

10. The apparatus of claim 4, wherein the disk supporting pedestal includes a first shaft connected with the motor through a plurality of gears engaging each other, and a spring element housing the first shaft.

11. The apparatus of claim 5, wherein the disk supporting pedestal includes a first shaft connected with the motor through a plurality of gears engaging each other, and a spring element housing the first shaft.

12. The apparatus of claim 2 further comprising a damping member for connecting the top housing with the bottom housing consisting of two portions, each including a damping head, a first spring disposed within the damping head, and a transmission shaft extended through a second spring and a first spring.

13. The apparatus of claim 4 further comprising a damping member for connecting the top housing with the bottom housing consisting of two portions, each including a damping head, a first spring disposed within the damping head, and a transmission shaft extended through a second spring and a first spring.

14. The apparatus of claim 5 further comprising a damping member for connecting the top housing with the bottom housing consisting of two portions, each including a damping head, a first spring disposed within the damping head, and a transmission shaft extended through extended through a second spring and a first spring.

15. The apparatus of claim 8 further comprising a damping member for connecting the top housing with the bottom housing consisting of two portions, each including a damping head, a first spring disposed within the damping head, and a transmission shaft extended through extended through a second spring and a first spring.

16. The apparatus of claim 2 further comprising a disk-detecting element located on the top housing for detecting the presence of the disk, and a repair-detecting element located within the repair base for detecting the presence of the repair member.

17. The apparatus of claim 4 further comprising a disk-detecting element located on the top housing for detecting the presence of the disk, and a repair-detecting element located within the repair base for detecting the presence of the repair member.

18. The apparatus of claim 5 further comprising a disk-detecting element located on the top housing for detecting the presence of the disk, and a repair-detecting element located within the repair base for detecting the presence of the repair member.

19. The apparatus of claim 5, wherein the grinding element is an abrasive paper adhered to the elastomer.

* * * * *